Feb. 7, 1956  E. H. GJERSOE  2,733,517
TEMPLATE
Filed Feb. 13, 1953
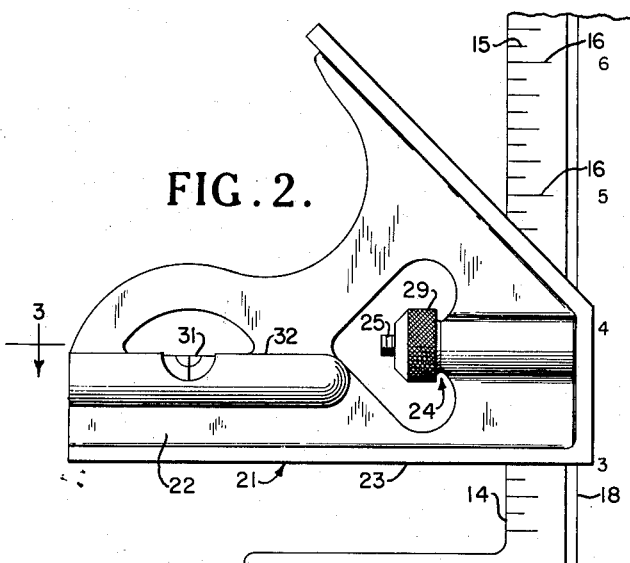
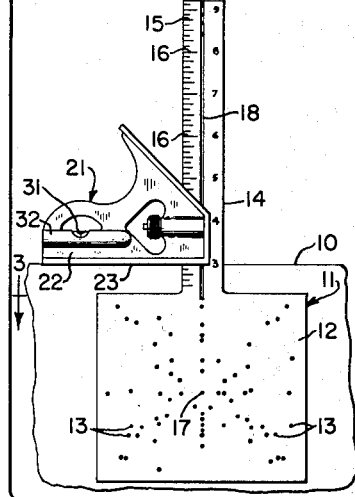
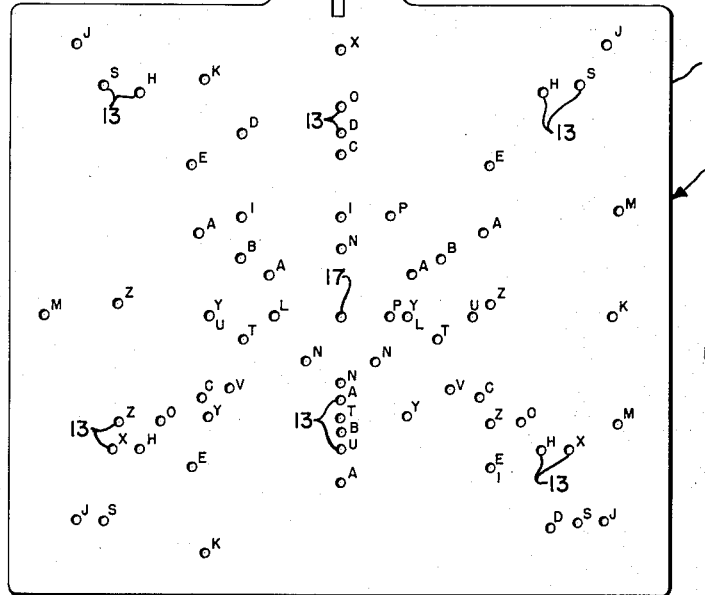
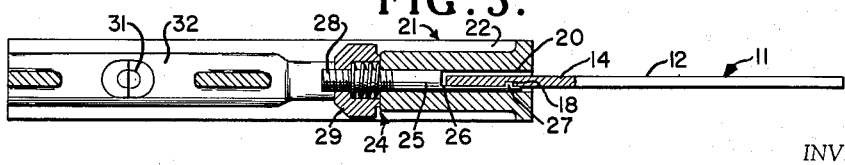
INVENTOR
ERLING H. GJERSOE
BY
ATTORNEYS 2,733,517
TEMPLATE Erling H. Gjersoe, Takoma Park, Md.

Application February 13, 1953, Serial No. 336,894

1 Claim. (Cl. 33—189)

(Granted under Title 35, U. S. Code (1952), sec. 266)

The invention described herein may be manufactured and used by or for the Government of the United States of America for governmental purposes without the payment of any royalties thereon or therefor.

The invention relates to a spotting jig and more particularly to a template which is adapted to facilitate the quick and accurate laying out and thereafter drilling of a plurality of holes in a panel whereupon suitable electrical devices may be mounted thereon.

Furthermore, the invention provides a new and improved template having a plurality of holes drilled therein, the holes being designated by alphabetic characters stamped on or applied to the surface of the template or gauge element in any other suitable manner. The holes are preferably uniform in size and are drilled accurately such that their axes are perpendicular to the surface of the template and grouped in such a manner as to correspond to the holes in various electronic devices such, for example, as a meter, condenser, vernier dial, powerstat, or variac whereupon an instrument panel may be punched and drilled to facilitate the mounting of such devices in their respective drilled holes. Furthermore, the template is provided with a shank or blade integrally formed therewith and numerically marked in inches measured from the center indexing hole formed in the template. A head is slidably arranged on the shank and adapted to be locked thereto in any desired position, the head being disposed at a right angle with respect to the shank and includes a straight edge which may be arranged in abutting engagement with one edge of the panel to accurately spot or drill the panel in accordance with the particular type of electronic device to be mounted thereon.

An object of the present invention is to provide a new and improved device for laying out a series of holes to be drilled in an instrument panel in accordance with a predetermined pattern.

Another object of the invention is the provision of a plotting device wherein means are provided for accurately and quickly plotting a series of holes to be drilled in an instrument panel which correspond to the holes in the particular type of electronic device to be mounted on the panel.

Other objects and many of the attendant advantages of this invention will be readily appreciated as the same becomes better understood by reference to the following detailed description when considered in connection with the accompanying drawings wherein:

Fig. 1 is a plan view of a fragmentary portion of a panel illustrating the use of the improved template in connection therewith;

Fig. 2 is an enlarged plan view of the device of the present invention; and

Fig. 3 is an enlarged sectional view taken on the line 3—3 of Fig. 2.

Referring now to the drawing and more particularly to Fig. 1 thereof, the numeral 10 designates an instrument panel adapted to support various types of electronic devices. Arranged upon the panel 10 is the gauge or spotting device of the present invention generally indicated by the reference 11. The device 11 comprises a template 12 composed of any material suitable for the purpose such, for example, as hard steel or the like and having a plurality of pilot holes 13 formed therein, the holes being designated by alphabetic characters as shown and grouped in such a manner as to correspond to the holes arranged in a particular type of electronic device to be mounted on the panel.

The template has formed thereon a blade or shank 14 having a suitable linear measuring scale 15 thereon, the shank being numerically marked in inches as at 16, the scale markings being calculated from the center hole or indexing aperture 17 formed in the template. The shank 14 is provided with a slot or groove 18 extending the full length thereof.

A head generally indicated by the reference character 21 is slidably arranged on the shank 14 and comprises a body portion 22 having formed thereon a straight edge 23 adapted to engage the panel 10, Fig. 1, when the device is in use. The head is provided with a slot 20 for reception of the shank 14 the head being adjustably mounted on the shank and clamped in an adjusted position thereon by a clamping arrangement 24 comprising a bolt 25 notched at one end as at 26 and having a lug 27 formed thereon and disposed within the groove 18 formed in the shank 14. The bolt 25 is threaded as at 28 for threaded engagement with a clamping nut 29. By the aforesaid arrangement the head 21 may be moved along the shank 14 at will to any desired position and locked on the shank by the bolt and nut arrangement. As shown more clearly on Fig. 2 a spirit level 31 is disposed within a chamber 32 formed in the body 22, the level being maintained within the chamber in any conventional manner.

It will be understood that the aforesaid device is intended to be used in connection with a suitable reference table or chart which indicates the particular types, model number, manufacturer names and code letters associated therewith, the code letter corresponding to the letters on the template. For example, a meter having a code number 125 and manufactured by a particular manufacturer such, for example, G. E. would be identified in connection with a code letter C appearing on the chart. Thus by consulting the chart it would be possible to select the pilot holes in the template which correspond to the holes in that particular type of electronic device to be mounted on the panel and thus assuring proper mounting of the device upon the panel. It will be understood that the holes may be drilled with the template in place on the panel by employing a suitable power drill, the pilot holes being used as a guide for the drill bit. If desired, however, the position of the holes to be drilled may be marked on the panel with a suitable instrument such, for example, as a punch or pencil and thereafter drilled when the template is removed from the panel. Furthermore, by the spotting jig arrangement with the square or straight edge 23 adjustably mounted on the shank 14 means are provided whereby a panel is accurately marked and drilled to facilitate the mounting of various electrical devices thereon, the square or straight edge being adapted to assure alignment of the holes to be drilled in the panel and the indexing hole 17 provides means for centering the template on the panel with respect to the holes to be plotted on the panel and thereafter drilled.

Obviously many modifications and variations of the present invention are possible in the light of the above teachings. It is therefore to be understood that within the scope of the appended claim the invention may be practiced otherwise than as specifically described.

What is claimed as new and desired to be secured by Letters Patent in the United States is:

A position indicating device comprising a thin rectilinear template member having a shank member formed integrally therewith and extending from one edge thereof, said shank member being coplaner with said template, said template having a plurality of circular holes therein to locate the marking of desired positions on a surface, said shank having a groove cut longitudinally into one side thereof, said shank having a series of equally spaced indicia along its length, a reference member having a slot therein for engaging opposite sides of the shank in the plane of said template, means in said reference member for engaging in said groove and clamping said member to the shank, said member having a surface forming a straight edge extending at right angles to the plane of said shank when the member is clamped on said shank, said straight edge surface extending beyond the plane of said shank on both sides of said plane, said straight edge being adapted to engage the edge of a member to be marked thereby to position the template member with respect to the edge, at least one of said marking locating holes in said template being formed on the center line of said shank and disposed at a predetermined distance from the first of said series of indicia whereby said markings may be located at predetermined distances from the edge of a surface to be marked.

References Cited in the file of this patent

UNITED STATES PATENTS

| | | |
|---|---|---|
| D. 156,686 | Adams | Jan. 3, 1950 |
| 689,354 | Colton | Dec. 17, 1901 |
| 838,355 | Realing | Dec. 11, 1906 |
| 870,520 | Palm | Nov. 5, 1907 |
| 1,307,233 | Bernard | June 17, 1919 |
| 1,369,470 | Rian | Feb. 22, 1921 |
| 1,382,271 | Cunningham | June 21, 1921 |
| 2,245,350 | Marshall | June 10, 1941 |
| 2,448,440 | King | Aug. 31, 1948 |